(12) United States Patent
Prendergast et al.

(10) Patent No.: US 9,411,477 B2
(45) Date of Patent: Aug. 9, 2016

(54) METHOD AND APPARATUS FOR IDENTIFICATION OF TOUCH PANELS

(71) Applicant: Parade Technologies, Ltd., Santa Clara, CA (US)

(72) Inventors: Patrick N Prendergast, Lynnwood, WA (US); Erik Anderson, Shoreline, WA (US)

(73) Assignee: PARADE TECHNOLOGIES, LTD., Santa Clara, CA (US)

(*) Notice: Subject to any disclaimer, the term of this patent is extended or adjusted under 35 U.S.C. 154(b) by 35 days.

(21) Appl. No.: 14/201,520

(22) Filed: Mar. 7, 2014

(65) Prior Publication Data

US 2014/0285467 A1 Sep. 25, 2014

Related U.S. Application Data

(63) Continuation of application No. 12/753,757, filed on Apr. 2, 2010, now Pat. No. 8,698,760.

(60) Provisional application No. 61/256,296, filed on Oct. 29, 2009.

(51) Int. Cl.
  *G06F 3/044* (2006.01)
  *G06F 3/041* (2006.01)
  *G06F 3/045* (2006.01)

(52) U.S. Cl.
  CPC .............. *G06F 3/044* (2013.01); *G06F 3/0416* (2013.01); *G06F 3/041* (2013.01); *G06F 3/045* (2013.01)

(58) Field of Classification Search
  None
  See application file for complete search history.

(56) References Cited

U.S. PATENT DOCUMENTS

| 6,738,048 | B1 | 5/2004 | Rundel |
| 7,439,961 | B2 | 10/2008 | Kong |
| 2002/0133245 | A1* | 9/2002 | Lee ................. G06F 1/601 700/94 |
| 2002/0196237 | A1 | 12/2002 | Fernando et al. |
| 2006/0209041 | A1 | 9/2006 | Studt et al. |
| 2007/0074913 | A1* | 4/2007 | Geaghan ............. G06F 3/044 178/18.06 |
| 2009/0009483 | A1 | 1/2009 | Hotelling et al. |
| 2009/0027334 | A1 | 1/2009 | Foulk et al. |
| 2009/0102801 | A1 | 4/2009 | Araki et al. |
| 2009/0167696 | A1 | 7/2009 | Griffin |
| 2013/0241874 | A1 | 9/2013 | Long et al. |

OTHER PUBLICATIONS

"Identifying Touch Screen Controller," Touch Base, <http://www.touch-base.com/documentation/Identifying%20touch%20screen%20controllers.htm> Revision 1.10, Mar. 9, 2011, 10 pgs.
Prendergast, Office Nation, U.S. Appl. No. 12/753,757, Oct. 20, 2013, 8 pgs.
Prendergast, Notice of Allowance, U.S. Appl. No. 12/753,757, Jan. 31, 2014, 8 pgs.

* cited by examiner

*Primary Examiner* — Seokyun Moon
(74) *Attorney, Agent, or Firm* — Morgan, Lewis & Bockius LLP (57) ABSTRACT

A method for configuring a touchscreen controller may include identifying a model of a touchscreen by measuring a capacitance or resistance of at least one element integrated in the touchscreen, identifying the model of the touchscreen based on the measured capacitance or resistance, and configuring the touchscreen controller based on the identified model of the touchscreen.

20 Claims, 9 Drawing Sheets

METHOD AND APPARATUS FOR IDENTIFICATION OF TOUCH PANELS

RELATED APPLICATIONS

This application is a continuation of U.S. application Ser. No. 12/753,757, filed Apr. 2, 2010, which claims priority to U.S. Provisional Patent Application No. 61/256,296, filed on Oct. 29, 2009, all of which are incorporated by reference herein in their entirety.

TECHNICAL FIELD

This disclosure relates to the field of touchscreen controllers and, in particular, to identification of a model of a touchscreen device connected to a touchscreen controller.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreen devices, touchscreens, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to press the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Described herein is a method and apparatus for determining and adapting a touchscreen controller to operate using a particular model of touchscreen device.

Touchscreen controllers typically operate using specific parameters designed to allow measurement and sensing of touch when coupled with a particular model of touchscreen. In one embodiment, these parameters may be programmed into the touchscreen controller after the touchscreen is physically interfaced to the touchscreen controller. If it is desired to use the touchscreen controller in a different assembly having a different touchscreen model, the controller may be reprogrammed with different parameters so that it can measure and sense touch with the different touchscreen. This approach, however, may restrict flexible usage of different touchscreen models in test, manufacturing, or assembly since the touchscreen controller is reprogrammed for each different touchscreen model.

In one embodiment, initial configuration of a touchscreen controller may include identifying a model of a touchscreen device by measuring a characteristic such as a resistance, of a coded element integrated into the touchscreen device and identifying the model of the touchscreen from a plurality of possible models based on the measured value. Identification logic in the touchscreen controller may identify parameters that allow the touchscreen controller to interface with the particular model of touchscreen. The appropriate set of parameters may be found in a lookup table that correlates the measured value with the set of parameters, for example. The touchscreen controller may be configured to operate using the parameters corresponding to the identified model of the touchscreen device.

Figure 1:
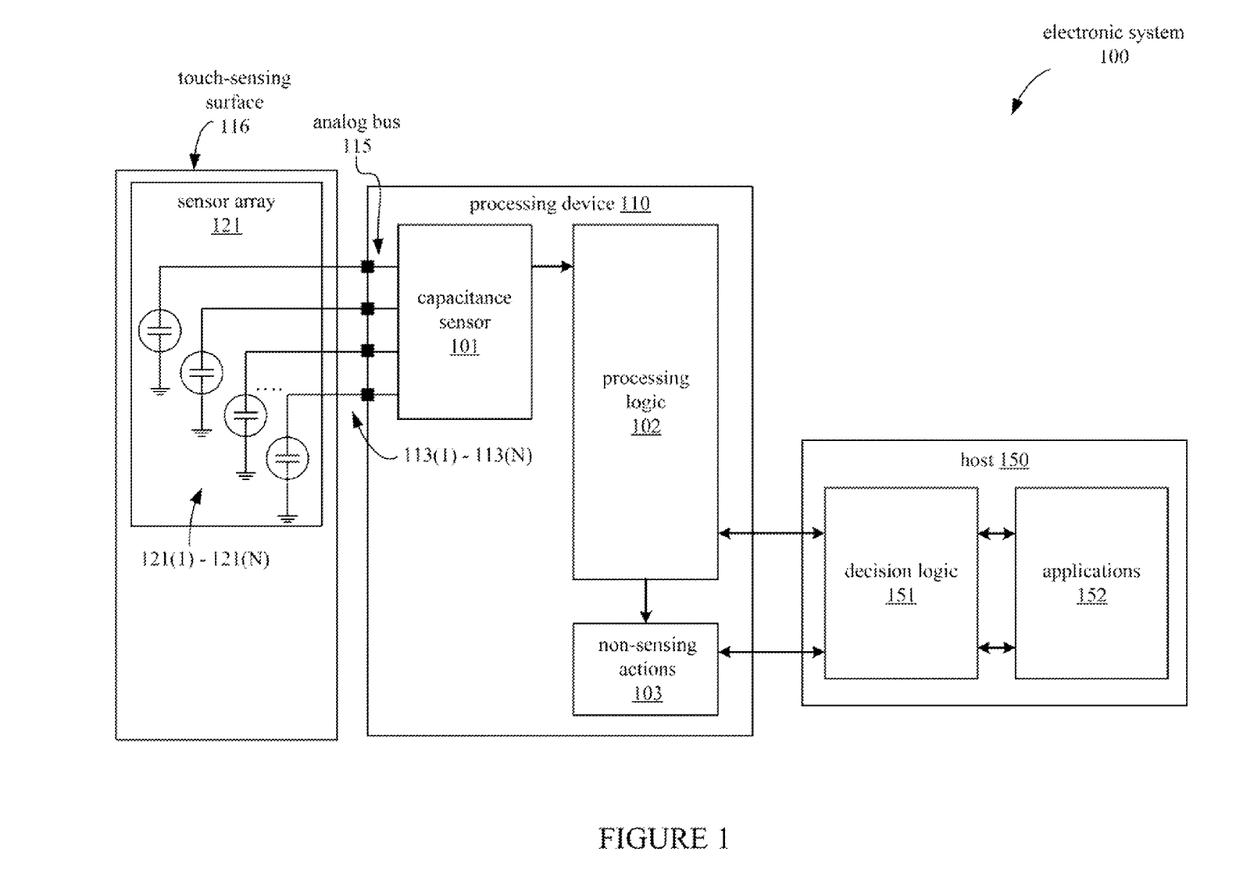
FIG. 1 illustrates a block diagram of an embodiment of an electronic system that processes touch sensor data.

FIG. 1 illustrates a block diagram of one embodiment of an electronic system 100 including processing device 110 that may be configured to identify a model of a touchscreen such as touch sensing surface 116 based on a coded element integrated into the touch-sensing surface 116. The electronic device 100 includes a touch-sensing surface 116 (e.g., a touchscreen, or a touch pad) coupled to a processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via an analog bus 115 transporting multiple signals. In this embodiment, each sensor element 121(1)-121(N) is represented as a capacitor. The capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array, tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines, on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware; software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld, multi-media devices, handheld video players, gaming devices, control panels of a household or industrial appliances, or other computer peripheral or input devices. Alternatively, the electronic system 100 may be used in other types of devices. It should be noted that the components, of electronic system 100 may include all the components described above. Alternatively, electronic system 100 may include only some of the components described above, or include additional components not listed herein.

Figure 2:
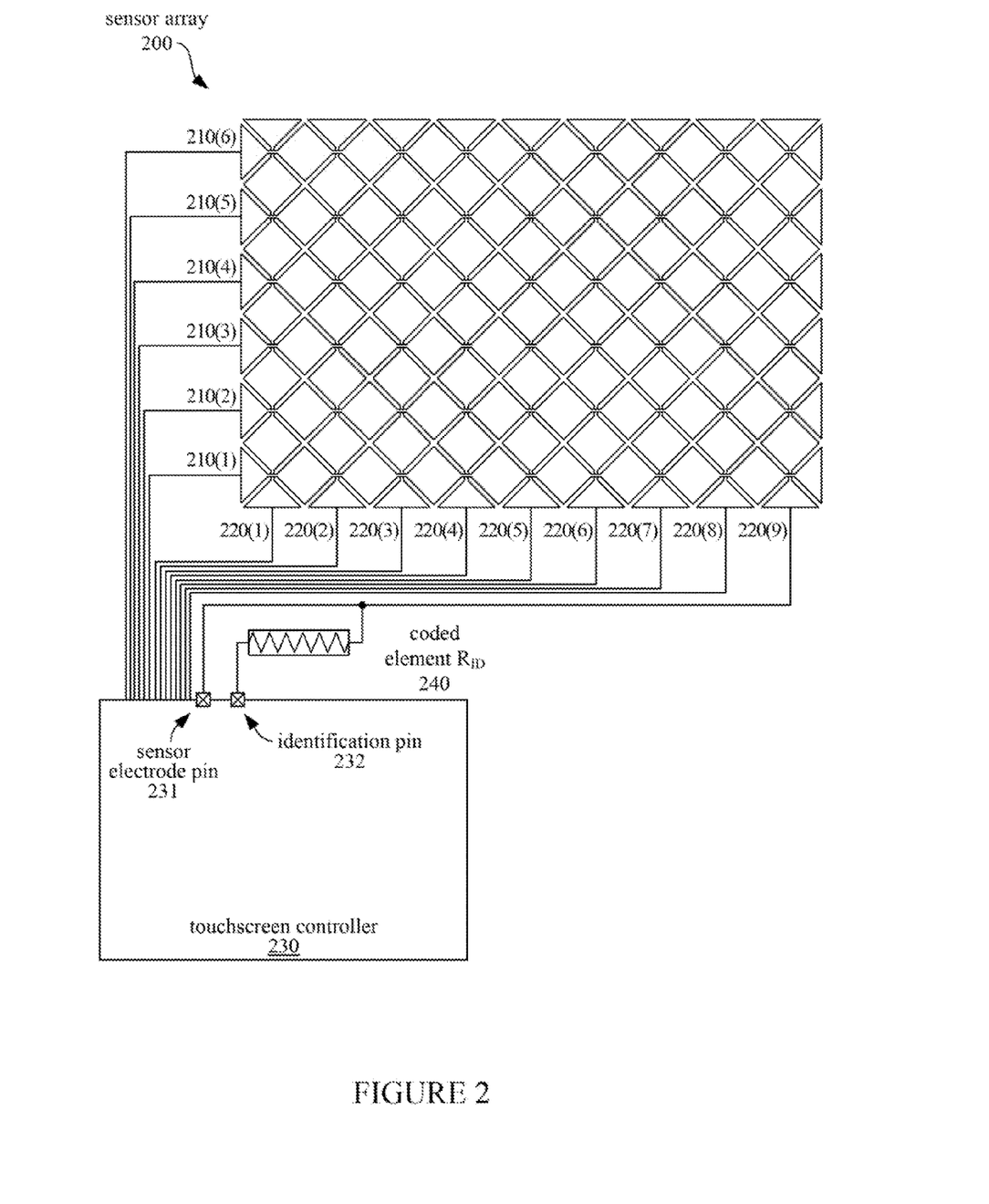
FIG. 2 illustrates a touchscreen controller and sensor array, according to an embodiment.

FIG. 2 illustrates a touchscreen assembly including a touchscreen controller 230 connected with a sensor array 200, which may be part of a touchscreen device similar to touch-sensing surface 116. Touchscreen controller 230 may be included as part of a processing device such as processing device 110. For example, the touchscreen controller 230 may be implemented by circuitry contained within processing logic 102 or capacitance sensor 101. Alternatively, the touchscreen controller 230 may be implemented as a separate module within processing device 110.

Sensor array 200 includes a number of horizontal sensor elements 210(1)-210(6) and vertical sensor elements 220(1)-220(9). Each of the sensor elements 210(1)-210(6) and 220(1)-220(9) is connected to the touchscreen controller through a sensor electrode pin such as sensor electrode pin 231. FIG. 2 also illustrates a coded element 240 having a specific measurable characteristic. In one embodiment, the coded element may be a resistor having a resistance of $R_{ID}$. The coded element 240 may be connected between one of the sensor elements, such as sensor element 220(9), and an identification pin 232 of the touchscreen controller 230.

In one embodiment, the coded element 240 and the sensor elements 210 and 220 are manufactured from the same material. For example, the sensor elements 210 and 220 and the coded element 240 may all be manufactured from an indium-tin oxide (ITO) material. The coded element 240 may be manufactured using the same process as the sensor elements 210 and 220. In an alternative embodiment, the coded element 240 may be constructed from printed carbon or may be constructed from one or more discrete resistors.

In one embodiment, the sensor array 200 and coded element 240 are connected to the touchscreen controller through a single connector. It should also be noted that because the coded element 240 is connected to one of the sensor electrodes 220(9), the interface between the touchscreen device, including the sensor array 200, and the touchscreen controller uses only one additional pin for the touchscreen device identification process, which is the identification pin 232.

In one embodiment, the touchscreen controller 230 is configured to identify the manufacturer and model of the touchscreen device by measuring a resistance $R_{ID}$ of the coded element 240. The number of possible models and manufacturers that can be resolved by the touch controller 230 depends on the accuracy of the measurement and the tolerance of the coded element 240. In one embodiment, the measurement of the coded element and identification of the model and manufacturer of the touchscreen occurs at run-time. In another embodiment, the identification occurs at first power on of the touchscreen controller and the touchscreen panel.

In one embodiment where the coded element 240 is a resistor, the touchscreen controller 230 may measure the resistance $R_{ID}$ of the coded element 240 by forcing a known current through the coded element 240 using a current digital to analog converter (IDAC). In an alternative embodiment, the resistance $R_{ID}$ of the coded element 240 can be measured by creating a voltage divider that divides a known reference voltage. For example, a reference resistor having a known value may be connected in series with the coded element 240.

Figure 3:
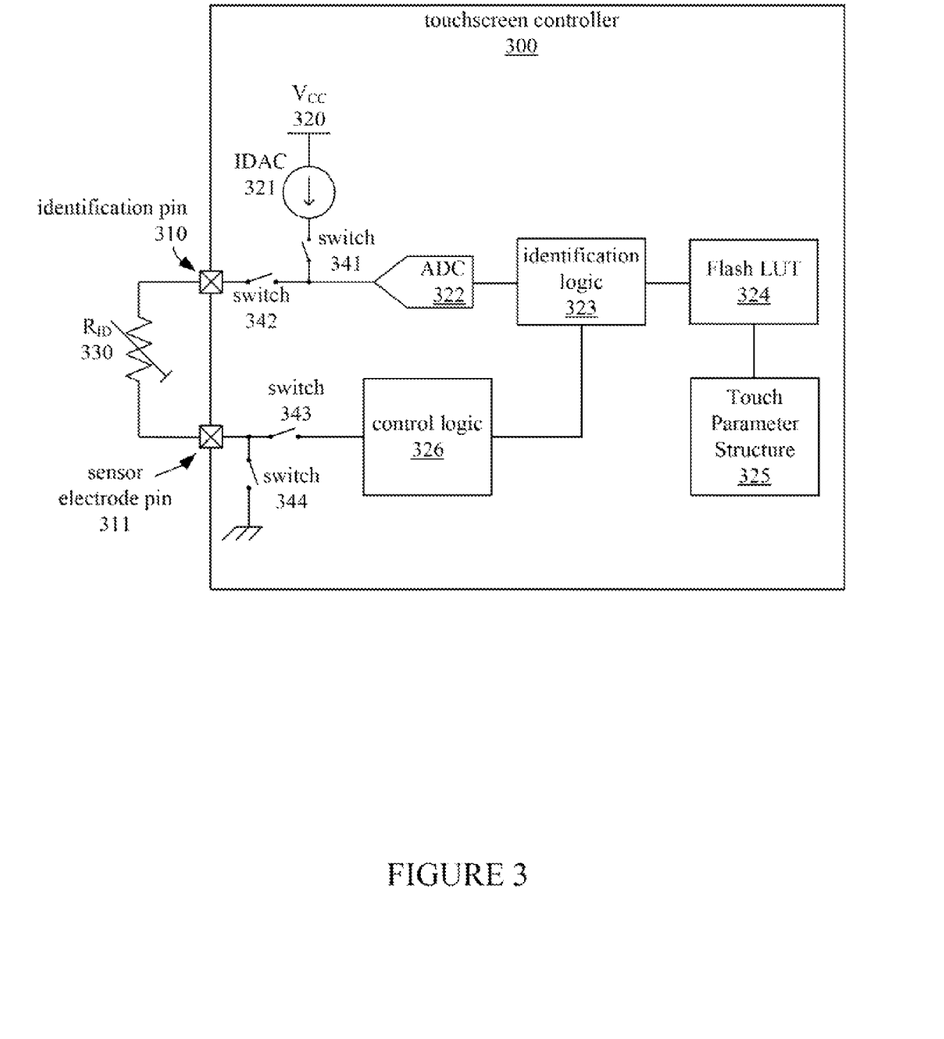
FIG. 3 illustrates a touchscreen controller, according to an embodiment.

FIG. 3 illustrates one embodiment of a touchscreen controller 300 that may perform similar functions as touchscreen controller 230. Touchscreen controller 300 includes an identification pin 310 and a sensor electrode pin 311 for connecting with a coded element 330. In one embodiment, the coded element 330 is a coded resistor having a resistance of $R_{ID}$. In one embodiment, the coded element 330 is similar to the coded element 240 illustrated in FIG. 2.

Touchscreen controller 300 also includes a control logic 326 that is configured to interface with a touchscreen device, such as touch sensing surface 116, to which the touchscreen controller is connected. The touchscreen controller 300 also includes identification logic 323 connected with the control logic 326. The identification logic performs logic and control functions related to identifying the touchscreen device by measuring a characteristic of the coded element 330. In one embodiment, the identification logic 323 may also be coupled with a lookup table (LUT), such as LUT 324. In one embodiment, the LUT 324 may be implemented in a memory such as flash memory. LUT 324 may also be connected to a touch parameter structure 325, which may contain model-specific information for controlling and communicating with the host system or for interfacing with the touchscreen. For example, the parameters stored in the touch parameter structure 325, when stored in or accessed by the control logic 326, may allow the control logic 326 to interface with the touchscreen or communicate with the host system.

In one embodiment, the identification logic 323 is connected with an analog-to-digital converter (ADC) 322, which is connected through switch 341 to a current digital-to-analog converter (IDAC) 321, also known as a programmable current source. The IDAC 321 has its input connected to source voltage 320. In one embodiment, the IDAC 321 can be programmed to supply a known current at its output, which is connected to switch 341. The ADC 322 is also connected to identification pin 310 through switch 342.

When the touchscreen in which the coded element 330 is integrated is connected to the touchscreen controller 300, the coded element 330 is connected at one end to identification pin 310 and at the other end to sensor electrode pin 311. Sensor electrode pin 311 may be connected through switch 343 to control logic 326 and through switch 344 to ground. In an alternate embodiment IDAC 321 may be configured as a programmable; current sink connected to ground, and switch 344 may provide a connection to source voltage 320.

In one embodiment, the identification logic 323 measures the resistance $R_{ID}$ of the coded element 330 by closing switches 341, 342, and 344. With these switches activated, the coded resistance 330 is connected at one end to the IDAC 321 and at the other end to ground such that the IDAC 321 can supply a known current through the coded resistance 330. The ADC 322 measures the voltage difference generated between the identification pin 310 and the sensor electrode pin (ground) resulting from the passage of the known current from the IDAC 321 through the coded resistance 330.

In one embodiment, the identification logic 323 receives a value representing the measured voltage from the ADC 322 and calculates the magnitude of the coded resistance 330 based on the value and the known current supplied by the IDAC 321. The identification logic can then query the LUT 324 to find a range in which calculated $R_{ID}$ falls. In an alternate embodiment, since there is a 1-to-1 correspondence between the ADC output value and the coded resistance, the resistance calculation step can be skipped and the value representing the Measured voltage may be passed directly to the identification logic. In one embodiment, the LUT 324 correlates each of a plurality of touchscreen models with a range of resistance values. Using the LUT 324, the identification logic can determine the model of the touchscreen device to which the touchscreen controller 300 is connected.

The identification logic 323 can also identify parameters for interfacing with the identified touchscreen model, and for communicating with a host system. In one embodiment, the identification logic 323 identifies the appropriate parameters by performing another lookup using the identified model of the touchscreen device. Alternatively, the LUT 324 may correlate the resistance of $R_{ID}$ directly with the parameters so that the identification logic 323 can identify the appropriate parameters based on the calculated resistance $R_{ID}$.

In one embodiment, the parameters for the identified model of touchscreen device are located in the touch parameter structure 325. The identification logic can retrieve the appropriate parameters from the touch parameter structure 325 and communicate the parameters to the control logic 326. Control logic 326 can then operate using the appropriate parameters for operating the specific model of touchscreen device to which the touchscreen controller 300 is connected.

When the identification logic 323 is not measuring a characteristic of coded element 330, the switches 341, 342, and 344 can be opened so that signals from a sensor element can be received at sensor electrode pin 311 without being adversely affected by the presence of the coded element 330.

For example, when the touchscreen controller 300 is controlling the touchscreen device, switches 342 and 344 may be opened while switch 343 is closed so that the control logic 326 is connected to sensor electrode pin 311, at which a signal may be presented to or received from a sensor element of the touchscreen device.

Figure 4:
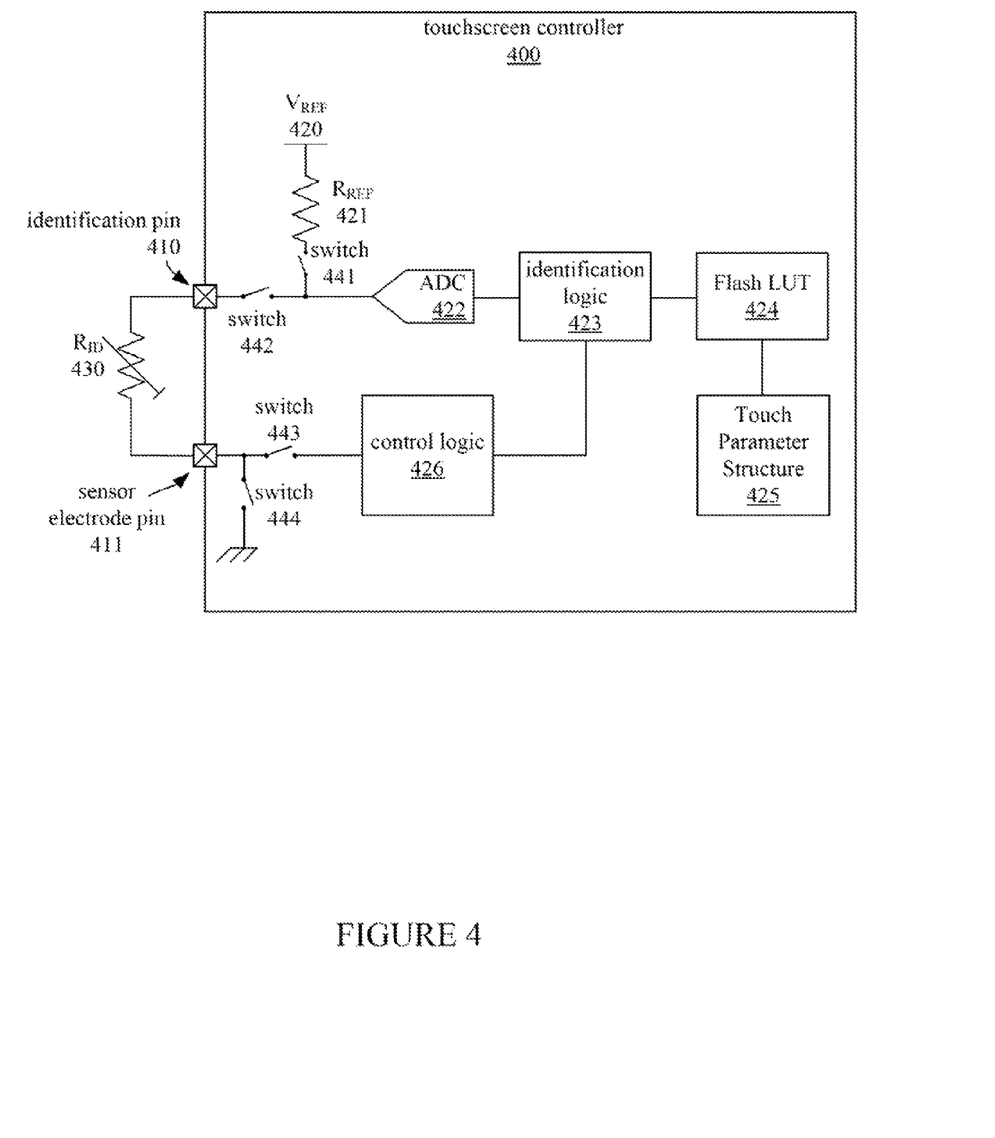
FIG. 4 illustrates a touchscreen controller, according to an embodiment.

FIG. 4 illustrates one embodiment of a touchscreen controller 400 that may perform similar functions as touchscreen controller 230. Touchscreen controller 400 includes an identification pin 410 and a sensor electrode pin 411 for connecting with a coded element 430. In one embodiment, the coded element 430 is a coded resistor having a resistance of $R_{ID}$. In one embodiment, the coded element 430 is similar to the coded element 240 illustrated in FIG. 2.

Touchscreen controller 400 also includes a control logic 426 that is configured to interface with a touchscreen having a touch sensing surface, such as touch sensing surface 116, to which the touchscreen controller is connected. The touchscreen controller 400 also includes identification logic 423 connected with the control logic 426. The identification logic performs logic and control functions related to identifying the touchscreen by measuring the value of the coded element 430. In one embodiment, the identification logic 423 may also be connected with a lookup table (LUT), such as LUT 424. In one embodiment, the LUT 424 may be implemented in a memory such as flash memory. LUT 424 may also be connected to a touch parameter structure 425, which may contain model-specific information for controlling and communicating with a host system, or for interfacing with the touchscreen. For example, the parameters stored in the touch parameter structure 425, when stored in or accessed by the control logic 426, may allow the control logic 426 to measure the touchscreen device.

In one embodiment, the identification logic 423 is connected with an analog-to-digital converter (ADC) 422, which is connected through switch 441 to a reference resistor 421 having a resistance of $R_{REF}$. Reference resistor 421 is connected to a reference voltage 420 having a voltage level $V_{REF}$. ADC 422 is also connected to identification pin 410 through switch 442'.

When the touchscreen device in which the coded resistance 430 is integrated is connected to the touchscreen controller 400, the coded element is connected at one end to identification pin 410 and at the other end to sensor electrode pin 411. Sensor electrode pin 411 is connected through switch 443 to control logic 426 and through switch 444 to ground. In an alternate embodiment reference resistor 421 having a resistance of $R_{REF}$ may be connected to ground, and switch 444 may provide a connection to reference voltage 420 having a voltage level $V_{REF}$. In a still further embodiment ADC 422 may operate with a ratiometric reference that tracks $V_{REF}$ voltage 420, allowing said reference to be variable in magnitude while delivering an equivalent value from measurements.

In one embodiment, the identification logic 423 measures the resistance $R_{ID}$ of the coded element 430 by closing switches 441, 442, and 444. With these switches activated, the coded element 430 is connected at one end to the reference resistor 421 and at the other end to ground such that a voltage divider circuit is formed from the reference resistor 421 and the coded element 430. The input of the voltage divider circuit is connected to reference voltage 420 and the output of the voltage divider circuit is connected to ADC 422. The divider circuit divides the reference voltage 420, generating a divided output voltage at the identification pin 410. The ADC 422 measures the voltage difference generated between the identification pin 410 and the sensor electrode pin (ground) resulting from the application of the reference voltage 420 to the input of the voltage divider circuit.

In one embodiment, the identification logic 423 receives a value representing the measured voltage from the ADC 422 and calculates the magnitude of the coded resistance 430 based on the value, the reference voltage 420, and the known resistance $R_{REF}$ of the reference resistor 421. The identification logic can then query the LUT 424 to find a range in which the calculated $R_{ID}$ falls. In an alternate embodiment, since there is a 1-to-1 correspondence between the ADC output value and the coded resistance, the resistance calculation step can be skipped and the value representing the measured voltage may be passed directly to the identification logic. In one embodiment, the LUT 424 correlates each of a plurality of touchscreen models with a range of resistance values. Using information in the LUT 424, the identification logic 423 can determine the model of the touchscreen device to which the touchscreen controller 400 is connected.

The identification logic 423 can also identify the parameters for interfacing with the identified touchscreen model, and for communicating with a host system. In one embodiment, the identification logic 423 identifies the appropriate parameters by performing another lookup using the identified model of the touchscreen device. Alternatively, the LUT 424 may correlate the resistance of $R_{ID}$ directly with the parameters so that the identification logic 423 can identify the appropriate parameters based on the calculated resistance $R_{ID}$.

In one embodiment, the parameters for the identified model of touchscreen device are located in the touch parameter structure 425. The identification logic can retrieve the appropriate parameters from the touch parameter structure 425 and communicate the parameters to the control logic 426. The control logic 426 can then operate using the appropriate parameters for operating the specific model of touchscreen device to which the touchscreen controller 400 is connected.

When the identification logic 423 is not measuring a characteristic of coded element 430, the switches 441, 442, and 444 can be opened so that signals from a sensor element can be received at sensor electrode pin 411 without being adversely affected by the presence of the coded element 430.

In one embodiment, after the model of the touchscreen device has been determined, the touchscreen controller is placed in normal operation mode. In normal operation mode, the identification pin is set to high impedance and the sensor electrode pin is connected to a capacitive sensing channel of the control logic 326 or 426. For example, when the touchscreen controller 400 is controlling the touchscreen device, switches 442 and 444 may be opened while switch 443 is closed so that the control logic 426 is connected to sensor electrode pin 411, at which a signal may be presented to or received from a sensor element of the touchscreen device.

In one embodiment, the above methods for identifying the model of a touchscreen device adds only one microcontroller pin, the identification pin 310 or 410, to an existing interface.

Figure 5:
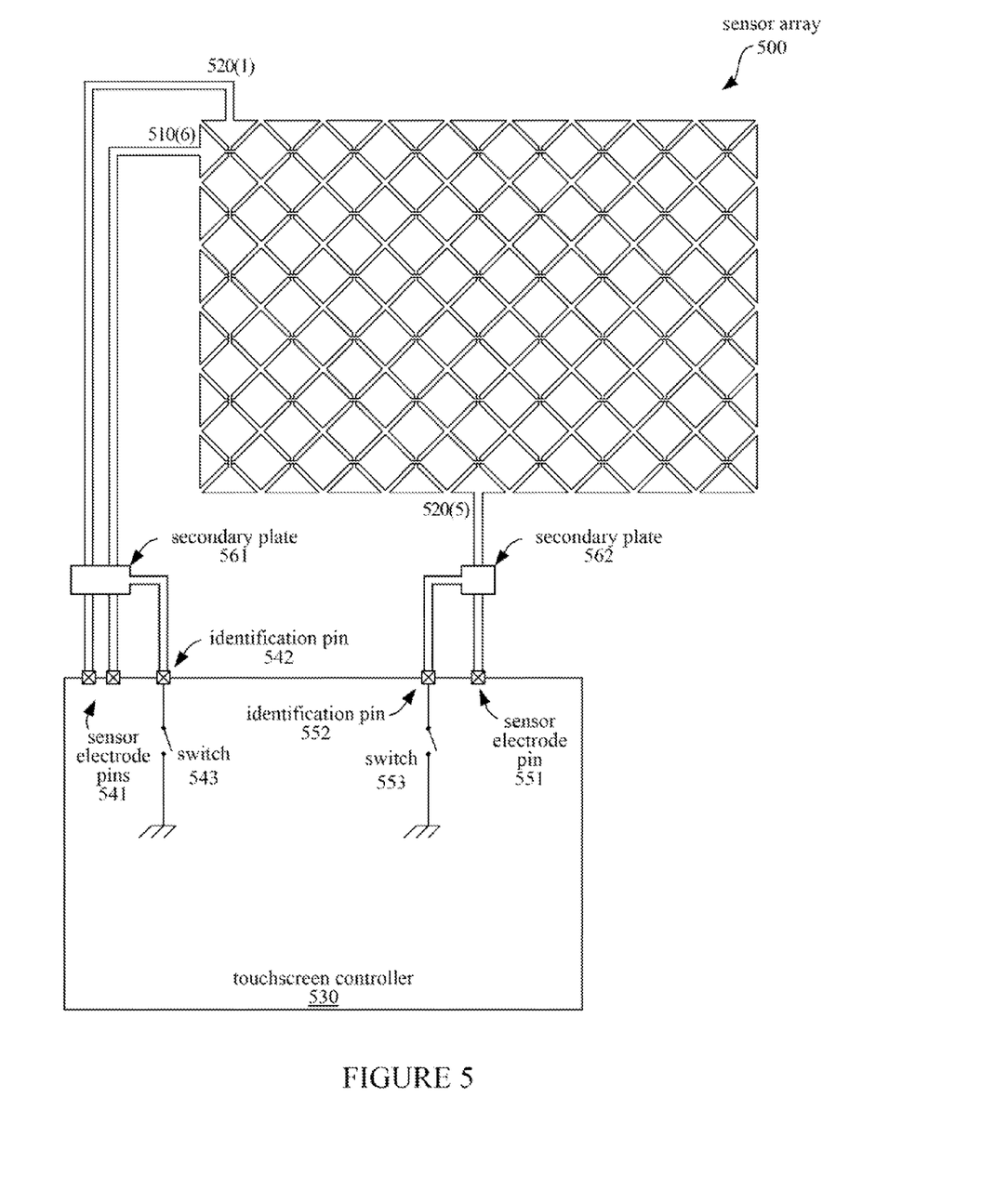
FIG. 5 illustrates a touchscreen controller and sensor array, according to an embodiment.

FIG. 5 illustrates a touchscreen assembly including a touchscreen controller 530 connected with a sensor array 500, which may be part of a touchscreen similar to touch-sensing surface 116. Touchscreen controller 530 may be included as part of a processing device such as processing device 110. For example, the touchscreen controller 530 may be implemented by circuitry contained within processing logic 102 or capacitance sensor 101. Alternatively, the touchscreen controller 530 may be implemented as a separate module within processing device 110.

Sensor array 500 includes a number of vertical sensor elements, including sensor elements 520(1) and 520(5), and a number of horizontal sensor elements, including sensor element 510(6). Sensor elements 520(1) and 510(6) are connected to touchscreen controller 530 through sensor electrode pins 541. Sensor element 520(5) is connected to the touchscreen controller 530 through sensor electrode pin 551. FIG. 5 further illustrates secondary plates 561 and 562, which are connected to the touchscreen controller 530 through identification pins 542 and 552, respectively. In one embodiment, the secondary plate 561 or 562 is connected to the identification pins 542 and 552, respectively, through a connector so that the secondary plates 561 and 562 may be connected to the identification pins 542 or 552 simultaneously with the connections between the sensor electrodes 520(1), 510(6), and 520 (5) and the sensor electrode pins 541 and 551. In an alternative embodiment, the secondary plates 561 or 562 may be soldered or otherwise permanently connected to the identification pins 542 or 552. Within the touchscreen controller 90, the identification pins 542 and 552 may be connected to ground through switches 543 and 553. In an alternate embodiment identification pins 542 and 552 may be connected to a low-impedance voltage reference through switches 543 and 553, and thus provide a virtual ground.

In one embodiment, the secondary plate 561 may be constructed from one or more ITO strips overlapped by primary plates formed by ITO strips connected to sensor elements 510(6) and 520(1). Similarly, secondary plate 562 may be overlapped by a primary plate formed by an ITO strip connected to element 520(5). For example, the primary plates may be formed from part of the routing material, or may be separate sensor structures in mutual or self capacitance configurations. If said secondary plates 561 and 562 are located outside the normal viewable area of the touchscreen device, they may be constructed from other conductive materials; e.g., copper, carbon, and silver conductive ink.

Figure 6A:
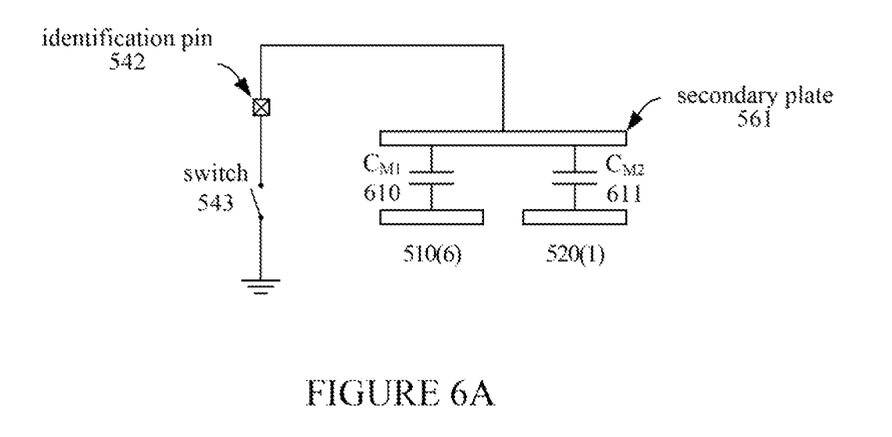
FIG. 6A illustrates an equivalent circuit of a coded element, according to one embodiment.

In one embodiment, the touchscreen controller 530 may include both of the secondary plates 561 and 562, and both of the identification pins 542 and 552, as illustrated in FIG. 5. Alternatively, a touchscreen controller 530 may include either secondary plate 561 connected to identification pin 542, or secondary plate 562 connected to identification pin 552. FIG. 6A is an equivalent circuit illustrating the capacitances between the secondary plate 561 and the sensor elements 510(6) and 520(1). In one embodiment, the capacitances $C_{M1}$ 610 and $C_{M2}$ 611 are formed between the secondary plate 561 and the sensor elements 510(6) and 520 (1), respectively. In one embodiment, the capacitance between sensor elements 510(6) and 520(1) is measured with switch 543 open (plate 561 is floating) and also with switch 543 closed (plate 561 is grounded). The difference between these measurements may be correlated with a model of touchscreen using a LUT similar to LUTs 324 or 424. In one embodiment, the identification pin 543 is an open drain pin that can be grounded by the touchscreen controller 530.

Figure 6B:
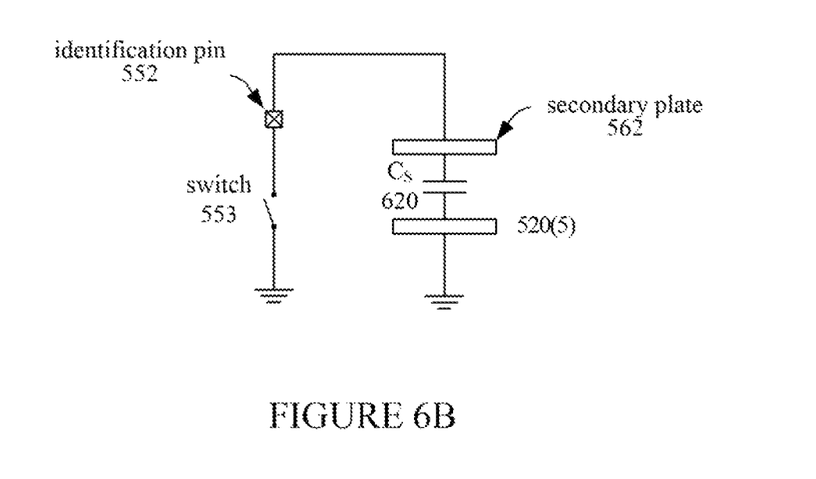
FIG. 6B illustrates an equivalent circuit of a coded element, according to one embodiment.

Alternatively, the touchscreen controller may measure the self capacitance of sensor element 520(5). FIG. 6B is an equivalent circuit illustrating the capacitances between the secondary plate 562 and sensor element 520(5). In one embodiment, the capacitance $C_S$ 620 is formed between the secondary plate 562 and the sensor element 520(5). In one embodiment, the self capacitance of sensor element 520(5) may be measured with the switch 553 open (plate 562 is floating) and also with the switch 553 closed (plate 562 is grounded). The difference in these measurements may be correlated with a model of touchscreen using a LUT similar to LUTs 324 or 424. In one embodiment, the identification pin 553 is an open-drain pin that can be grounded by the touchscreen controller 530. In an alternate embodiment, secondary plate 562 may not be capacitively coupled to other sensor electrodes of sensor array 500, but may be coupled directly to a sensor electrode pin. In this embodiment the self capacitance of the secondary plate 562 itself may be used to identify the specific model of attached touchscreen.

Figure 7:
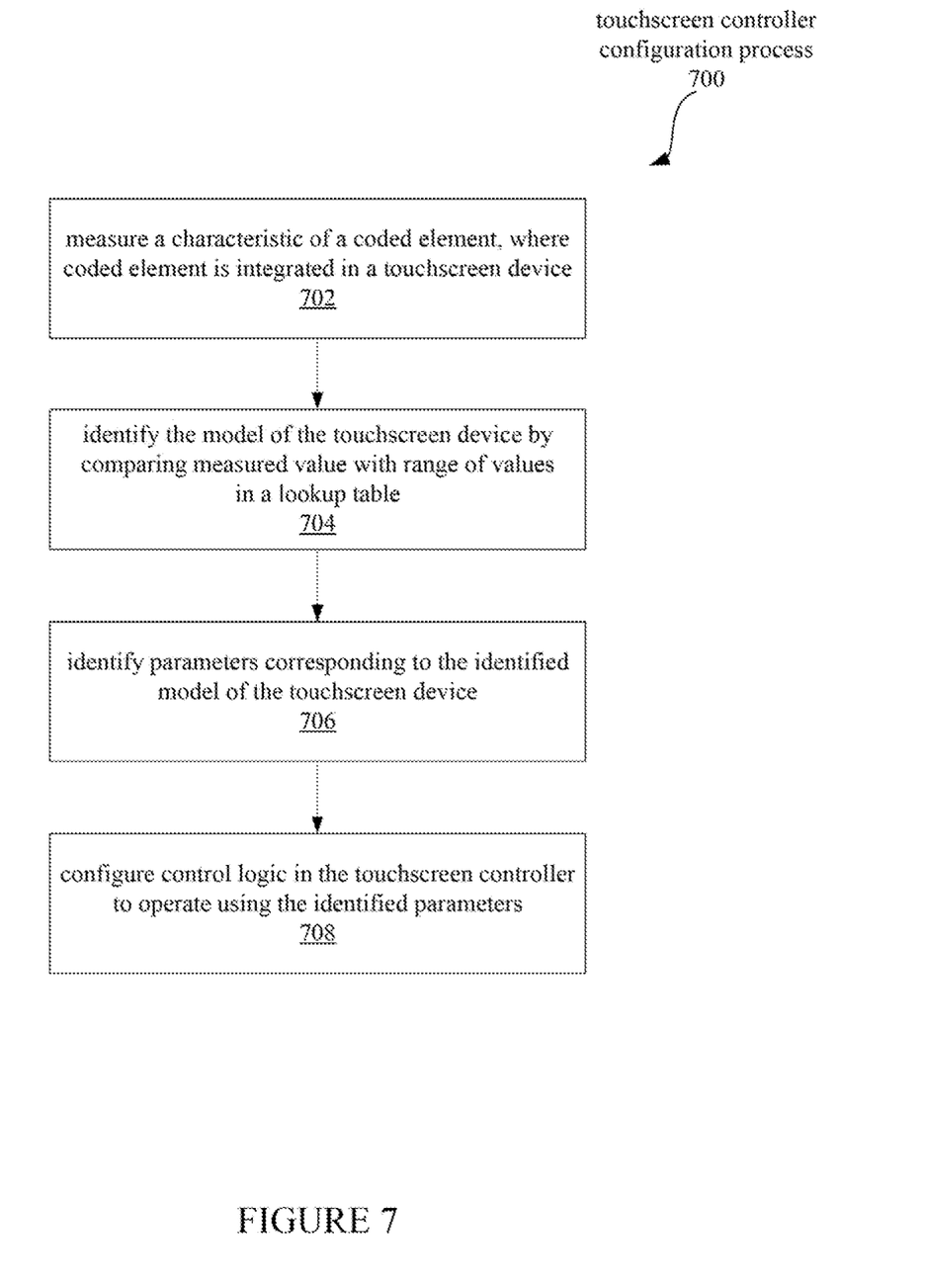
FIG. 7 is a flow diagram illustrating process for configuring a touchscreen controller, according to an embodiment.

FIG. 7 is a flow diagram illustrating a process for configuring a touchscreen controller, according to one embodiment. The touchscreen controller configuration process 700 may be performed by a touchscreen controller such as touchscreen controller 300 or touchscreen controller 400, as illustrated in FIGS. 3 and 4, respectively.

The touchscreen controller configuration process 700 begins at block 702, where the touchscreen controller measures a characteristic of a coded element integrated in a touchscreen device. The measurement of the characteristic, such as the resistance of the coded element, may be initiated by, for example, identification logic 323 or 423. In one embodiment, the identification logic 323 or 423 may determine the resistance $R_{ID}$ by passing a known current through the coded element 330 or 430, respectively. In another embodiment, the identification logic 323 or 423 may determine the resistance $R_{ID}$ by creating a voltage divider having coded element 330 or 430 (respectively) as an element in the voltage divider. Methods for measuring $R_{ID}$ will be described in further detail with reference to FIGS. 8 and 9. Alternatively, the coded element may be a capacitance such as the capacitances 610, 611, or 620, as illustrated in FIGS. 6A and 6B, or the self capacitance of secondary plate 562. From block 702, the process 700 continues at block 704.

At block 704, the touchscreen controller identifies the model of the touchscreen device by searching the lookup table to locate a matching resistance range. For example, the identification logic 323 or 423 may compare the measured resistance with value ranges in LUT 324 or 424, respectively. LUT 324 or 424 may contain information correlating the resistance with a model of touchscreen device. From block 704, the process 700 continues at block 706.

At block 706, the touchscreen controller identifies parameters corresponding to the identified model of the touchscreen. In one embodiment, the identification logic 423 may perform another lookup of the model of the touchscreen device to identify parameters for controlling and communicating with the particular model of touchscreen, and for communicating with a paired host or host protocol. In an alternative embodiment where the LUT 424 correlates a value of the coded element (such as resistance $R_{ID}$ or capacitances $C_{M1}$ 610, $C_{M2}$ 611, or $C_S$ 620) with model-specific parameters directly, the identification logic 423 only performs a single lookup. From block 706, the process 700 continues at block 708.

At block 708, control logic in the touchscreen controller is configured to operate using the identified parameters. For example, the identification logic 423 may copy the appropriate parameters from the touch parameter structure 425 to the control logic 426. Alternatively, the appropriate parameters for operating the identified touchscreen device may be copied from the touch parameter structure into the control logic by other means. Alternately, the identified parameters may be accessed directly by the control logic 426 from their location in the touch parameter structure 425.

Figure 8:
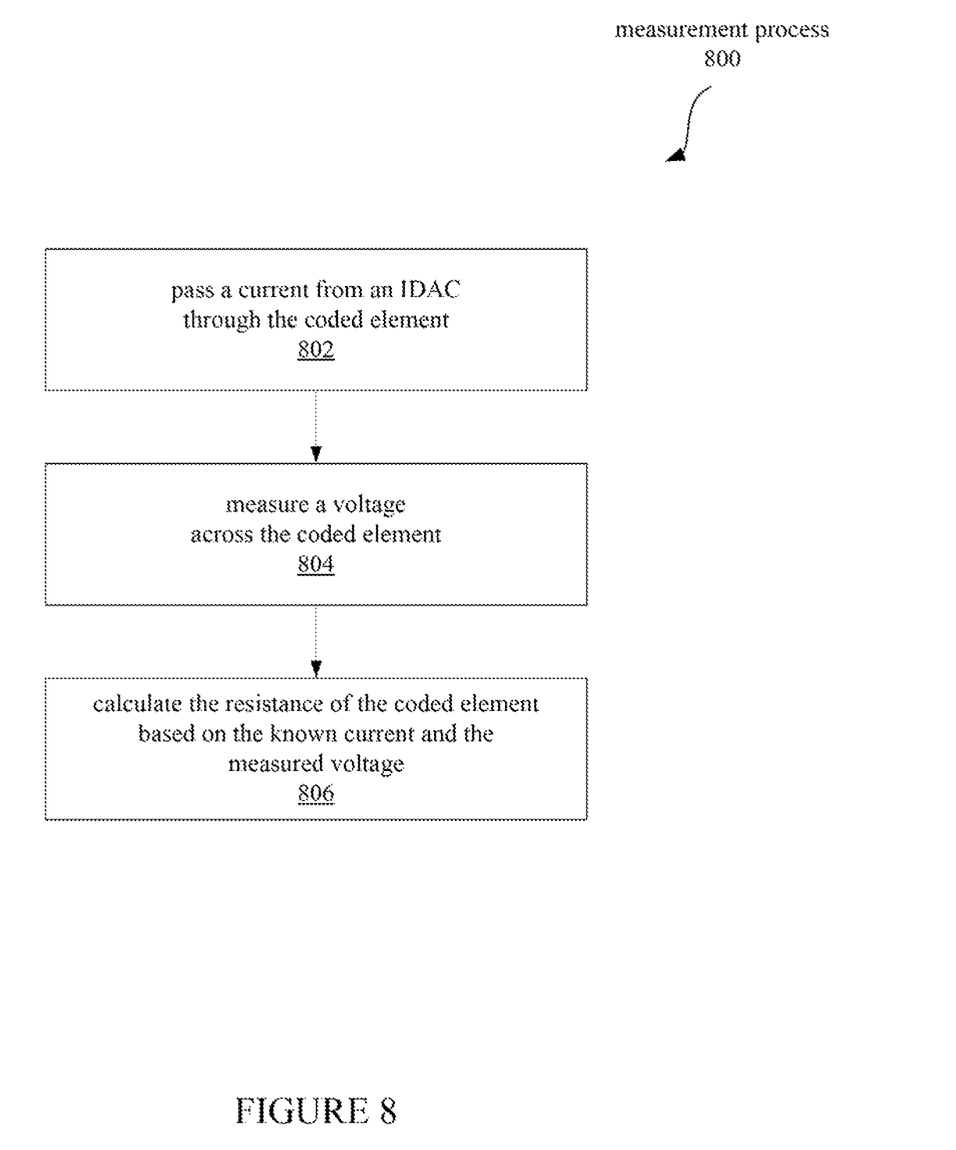
FIG. 8 is a flow diagram illustrating a process for measuring a coded element in a touchscreen controller, according to an embodiment.

FIG. 8 is a flow diagram illustrating a process for measuring a characteristic of a coded element using a current source such as a current digital to analog converter (IDAC), according to one embodiment. The measurement process 800 may be performed by a touchscreen controller such as touchscreen controller 300. In one embodiment, the operations of measurement process 800 may correspond to operations performed at block 702 of touchscreen controller configuration process 700.

The measurement process 800 begins at block 802. At block 802, the touchscreen controller passes a current through a coded element that is integrated into a touchscreen device. For example, a known current from the IDAC 321 may be passed through the coded element 330, as illustrated in FIG. 3. From block 802, the process 800 continues at block 804.

At block 804, the touchscreen controller measures a voltage across the coded element while the current is being passed through the coded element. For example, the ADC 322 may measure the voltage across the coded element 330 by measuring the voltage at identification pin 310 relative to, ground. From block 804, the process 800 continues at block 806.

At block 806, the touchscreen controller calculates the value of the coded element based on the current and the measured voltage. For example, the identification logic 323 may calculate the value of coded element 330 based on the known current supplied by the IDAC 321 and the voltage measured by the ADC 322. In one embodiment, the process 800 continues from block 806 to block 704 of touchscreen controller configuration process 700, where the calculated value is used to identify a model of the touchscreen device.

Figure 9:
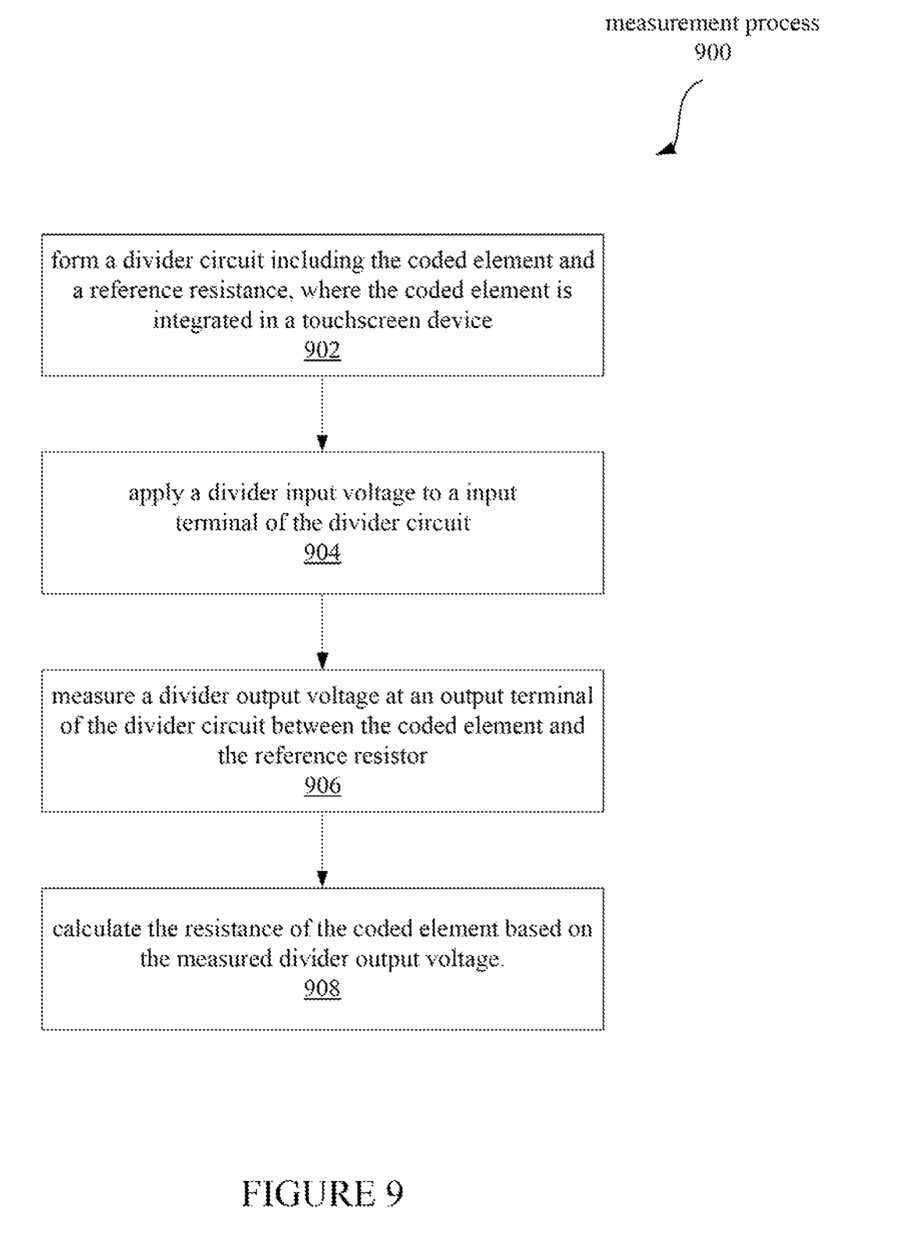
FIG. 9 is a flow diagram illustrating a process for measuring a coded element in a touchscreen controller, according to an embodiment.

FIG. 9 is a flow diagram illustrating a process for measuring a value of a coded element using a divider circuit arrangement, according to one embodiment. The measurement process 900 may be performed by a touchscreen controller such as touchscreen controller 400. In one embodiment, the operations of measurement process 900 may correspond to operations performed at block 702 of touchscreen controller configuration process 700.

Measurement process 900 begins at block 902, where the touchscreen controller forms a divider circuit including the coded element and a reference resistor, where the coded element is integrated in a touchscreen device. For example, a voltage divider circuit may be formed that includes reference resistor 421 and coded element 430 in series. In one embodiment, the coded element 430 is integrated into the touchscreen device and is connected to the identification pin 410 using the same connector as one or more sensor electrodes of the touchscreen device. In an alternative embodiment, the coded element 430 may be connected to the identification pin 410 through a solder connection or some other permanent or semi-permanent connection mechanism. Accordingly, the voltage divider circuit may be formed when the touchscreen device is physically connected to the touchscreen controller 400. From block 902, the process 900 continues at block 904.

At block 904, the touchscreen controller applies a divider input voltage to an input terminal of the divider circuit created at block 902. For example, in the touchscreen controller 400, the reference voltage 420 applies a voltage $V_{REF}$ to the input of the voltage divider circuit formed by the resistors 421 and 430. From $V_{REF}$, the voltage divider generates a voltage at the input of the ADC 422. From block 904, the process 900 continues at block 906.

At block 906, the touchscreen controller measures a divider output voltage at a terminal of the divider circuit between the coded element and the reference resistor. For example, the ADC 422 measures the divided output voltage generated by the voltage divider that includes reference resistor 421 and coded element 430. From block 906, the process 900 continues at block 908.

At block 908, the touchscreen controller calculates the value of the coded element based on the measured divider output voltage. For example, identification logic 423 calculates the resistance $R_{ID}$ of the coded element 430 based on the known resistance $R_{REF}$ of the reference resistor 421 and the known voltage $V_{REF}$ supplied by the voltage source 420. In one embodiment, the process 900 may continue from block 908 to block 704 of touchscreen controller configuration process 700, where the calculated value of the coded element is used to identify a model of the touchscreen device.

Thus, by performing the operations in the touchscreen controller configuration process 700, a touchscreen controller may identify a model of a touchscreen device by measuring a characteristic, such as a resistance or a capacitance, of a coded element integrated into the touchscreen device according a measurement process such as measurement process 700 or 800. According to process 700, the touchscreen controller may further configure the touchscreen controller to operate using parameters corresponding to the identified model of the touchscreen device.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be, implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
at a processing device that is electrically coupled to a touchscreen device via a plurality of sensor electrode pins and an identification pin, wherein the touchscreen device includes a plurality of sensor electrodes in a sensor array and a component external to the sensor array, and each of the plurality of sensor electrode pins is electrically coupled to at least one respective sensor electrode of the plurality of sensor electrodes:
electrically coupling to the component via one of the plurality of sensor electrode pins and the identification pin, wherein the component shares access to the one of the plurality of sensor electrode pins with a subset of sensor electrodes;
measuring an electrical characteristic of the component of the touchscreen device; and
identifying, by the processing device, a set of parameters for operating the touchscreen device based on the electrical characteristic.

2. The method of claim 1, wherein the electrical characteristic comprises at least one of resistance or capacitance.

3. The method of claim 1, wherein measuring the electrical characteristic comprises passing a known current through the component of the touchscreen device.

4. The method of claim 1, wherein measuring the electrical characteristic comprises creating a voltage divider comprising the component of the touchscreen device.

5. The method of claim 1, wherein identifying the set of parameters comprises:
identifying a model of the touchscreen based on the electrical characteristic; and
identifying the set of parameters based on the model of the touchscreen.

6. The method of claim 1, wherein identifying the set of parameters comprises identifying the set of parameters corresponding to the electrical characteristic in a lookup table.

7. The method of claim 1, further comprising configuring a touchscreen controller to operate the touchscreen device using the set of parameters.

8. The method of claim 7, wherein configuring the touchscreen controller comprises copying the set of parameters to control logic of the touchscreen controller.

9. The method of claim 1, further comprising operating the touchscreen device based on the electrical characteristic, wherein operating the touchscreen device based on the electrical characteristic comprises determining a user interaction with the touchscreen device using at least one of the set of parameters.

10. The method of claim 1, wherein the set of parameters comprises a capacitance indicative of a user interaction with the touchscreen device.

11. An electronic device, comprising:
a touchscreen device including a plurality of sensor electrodes in a sensor array and a coded element external to the sensor array;
a touchscreen controller that is electrically coupled to the touchscreen device via a plurality of sensor electrode pins and an identification pin, wherein each of the plurality of sensor electrode pins is electrically coupled to at least one respective sensor electrode of the plurality of sensor electrodes, and the touchscreen controller is configured to:
electrically couple to the component via one of the plurality of sensor electrode pins and the identification pin, wherein the component shares access to the one of the plurality of sensor electrode pins with a subset of sensor electrodes;
measure a characteristic of the coded element; and
identify a set of parameters for operating the touchscreen device based on the characteristic.

12. The electronic device of claim 11, wherein the characteristic of the coded element comprises resistance or capacitance.

13. The electronic device of claim 11, wherein the set of parameters comprises a capacitance indicative of a user interaction with the touchscreen device.

14. The electronic device of claim 11, further comprising a memory to store a lookup table, wherein the touchscreen controller identifies a model of the touchscreen device based on the characteristic via the lookup table.

15. The electronic device of claim 11, wherein the electronic device comprises a cellular telephone.

16. A touchscreen device, comprising:
a plurality of sensor electrodes in a sensor array;
a plurality of sensor electrode pins, wherein each of the plurality of sensor electrode pins is electrically coupled to at least one respective sensor electrode of the plurality of sensor electrodes;
an identification pin; and
a coded element external to the sensor array, wherein the coded element is electrically coupled between one of the plurality of sensor electrode pins and the identification pin, and shares access to the one of the plurality of sensor electrode pins with a subset of sensor electrodes;
wherein the touchscreen device is configured for electrically coupling to a processing device via the plurality of sensor electrode pins and the identification pin, and the processing device is configured for measuring a characteristic of the coded element of the touchscreen device, and identifying a set of parameters for operating the touchscreen device based on the characteristic.

17. The touchscreen device of claim 16, wherein the characteristic comprises resistance or capacitance.

18. The touchscreen device of claim 16, wherein the processing device is configured to implement a set of operations including:
identifying the set of parameters based on a model of the touchscreen device; and
configuring a touchscreen controller to operate the touchscreen device according the set of parameters.

19. The touchscreen device of claim 18, wherein identifying the set of parameters comprises identifying the set of parameters corresponding to the model in a lookup table.

20. The touchscreen device of claim 18, wherein the set of parameters comprises a capacitance indicative of a user interaction with the touchscreen device.

* * * * *